United States Patent [19]
Kielinski

[11] Patent Number: 6,059,512
[45] Date of Patent: May 9, 2000

[54] LIFTING AND MOVING APPARATUS

[76] Inventor: Thomas P. Kielinski, c/o BRAJ enterprise, inc. P.O. Box 1142, Blue Bell, Pa. 19422

[21] Appl. No.: 08/984,798

[22] Filed: Dec. 4, 1997

Related U.S. Application Data

[60] Provisional application No. 60/022,197, Jul. 19, 1996.

[51] Int. Cl.⁷ .............................. B62B 1/04; B62B 1/06
[52] U.S. Cl. .................... 414/490; 414/446; 414/607; 280/47.18; 280/47.28; 280/47.36
[58] Field of Search .................................. 414/444, 446, 414/447, 457, 490, 607, 608; 280/47.18, 47.28, 47.315, 47.36; 254/8 R, 8 B, 8 C, 116–119, 123, 129, 130, 131.5, 134

[56] References Cited

U.S. PATENT DOCUMENTS

| | | |
|---|---|---|
| 1,742,735 | 1/1930 | Strippel . |
| 2,215,529 | 9/1940 | Nazarko ................................. 414/490 |
| 2,374,982 | 5/1945 | Davies .................................. 414/537 |
| 2,461,203 | 2/1949 | Evans ................................... 414/490 |
| 3,298,705 | 1/1967 | Neaverson et al. . |
| 3,939,999 | 2/1976 | Nielson ................................. 414/444 |
| 4,239,249 | 12/1980 | Sprague ............................. 414/444 X |
| 5,257,892 | 11/1993 | Branch ................................ 280/444 X |
| 5,306,112 | 4/1994 | Kielinski ................................ 414/490 |
| 5,593,271 | 1/1997 | Hall ....................................... 414/490 |

FOREIGN PATENT DOCUMENTS

| | | |
|---|---|---|
| 792623 | 8/1968 | Canada . |
| 2 101 558 | 1/1983 | United Kingdom . |
| 92/13745 | 8/1992 | WIPO ................................... 414/490 |

*Primary Examiner*—James W. Keenan
*Attorney, Agent, or Firm*—Howson & Howson

[57] ABSTRACT

A manual lifting and moving apparatus comprises a rigid bar having a pair of rollers on an axle at one end and a handle at the other end. Struts pivoted to the roller axle have a boom pivotally connected to their opposite ends. One end of the boom is received in a channel mounted on the rigid bar and connectible to the channel by a pin extending through a pair of aligned holes in the sidewalls of the channel, there being multiple pairs of aligned holes to provide plural selectable attachment points. The other end of the boom has a hook which can be engaged with a loading ramp adapter or used to lift various objects. The boom can also be secured in a collapsed position along the rigid bar, allowing the apparatus to be used as a pry bar, to maneuver a skid truck or lift a material-containing drum, and also allowing attachments, such as a hand truck adapter or a pallet truck adapter to be connected to the channel and to one end of the boom.

7 Claims, 4 Drawing Sheets

LIFTING AND MOVING APPARATUS

This application claims benefit of provisional application Ser. No. 60/022,197 filed Jul. 19, 1996.

BRIEF SUMMARY OF THE INVENTION

This invention relates to lifting, and more particularly to a manually operable lifting and moving apparatus useful for manipulating heavy objects such as loading ramps, pallets, chemical drums and other containers of substances, skid trucks and the like.

In the handling of moderately heavy articles, for example in loading and unloading trucks, it is usually necessary for loading dock personnel to have available various different tools for facilitating the manipulation of the articles. For example, pry levers, hand trucks, manual pallet trucks, drum grips and similar utensils are frequently needed on a given loading dock. The expense of acquiring all of these items is significant, and a substantial amount of room is required for their storage.

There is therefore a need for a versatile, multipurpose, manually operable lifting and moving apparatus for facilitating handling a variety of moderately heavy articles that cannot otherwise be moved easily and safely.

The principal object of this invention is to provide a versatile manual lifting and moving apparatus, which can be used in many different applications for maneuvering heavy articles. It is also an object of the invention to provide a manual lifting and moving apparatus which can be easily converted from one configuration to another. A further object is to provide a manual lifting and moving apparatus that can be readily taken down for shipment and storage. Still another object of the invention is to provide a manual lifting and moving apparatus having a high degree of ergonomic efficiency. Other objects include the provision of a manual lifting and moving apparatus which is safe to use, simple in construction and inexpensive to manufacture, but strong and durable.

The preferred lifting and moving apparatus in accordance with the invention comprises a rigid bar having two ends, with at least one roller adjacent to one end of the bar and a handle at the other end. At least one strut, in pivoting relationship with the bar, extends forward and upward from a location adjacent to the roller end of the bar. The strut is preferably pivoted on the roller axis. A load supporting boom is pivoted to the strut at an intermediate location along the length of the boom. One end of the boom is connectible to an attachment point on the bar at a location spaced from the roller end of the bar in a direction toward the handle end of the bar.

The length of the load supporting boom is preferably such that, when its one end is disconnected from the attachment point on the rigid bar, the boom can be brought into a position in which it extends along the rigid bar with its one end located adjacent to the roller end of the bar and its opposite end adjacent to a location on the bar between the ends of the bar.

In a preferred version of the lifting and moving apparatus the rigid bar is provided with a plurality of attachment points spaced from one another, each at a location spaced from the roller end of the bar in the direction toward the handle, and the one end of the boom is connectible to any selected attachment point.

The lifting and moving apparatus may include an elongated channel attached to the rigid bar. The channel has a pair of opposed, spaced sidewalls extending lengthwise along the bar, and a flange on at least one of the sidewalls, defining a slot through which the boom can extend so that the one end of the boom is located between the sidewalls of the channel. Preferably, a pair of opposed flanges is provided, the flanges extending toward each other from the sidewalls. The end of the boom has means engageable with the flange or flanges for preventing the first end of the boom from being removed from the channel except at the ends of the channel. Consequently, the end of the boom is guided for lengthwise movement within the channel.

In a preferred embodiment, the end of the boom has a pair of transversely extending bosses on its opposite sides, respectively engageable with opposed flanges on the sidewalls of the channel. The sidewalls of the channel have a pair of aligned holes at each attachment point, and the boom has a through hole extending through the bosses. The through hole is selectably alignable with the pair of aligned holes at each attachment point.

To lock the boom in its collapsed condition along the rigid bar, the boom may be provided with a hole at an intermediate location along its length, this hole being alignable with a hole at one attachment point. This feature allows the end of the boom to be secured at each attachment point and, alternatively, allows the boom to be secured in the collapsed position. Preferably the hole at the attachment point is a hole in a sidewall of a channel extending along the rigid bar.

The apparatus can be used for handling containers such as 55 gallon drums. With the boom in its collapsed condition, a plate at the roller end of the rigid bar is positioned underneath the drum, and an auxiliary rod having hooks at both ends is connected between a hook at one end of the boom and the upper rim of the drum.

A plate rigidly connected to the bar at its roller end lies substantially in a plane oblique to the direction extending from the roller end to the handle end. A drum can be supported by the lifting and moving apparatus, with the bottom rim resting on the plate, and with the top rim engaged by an adjustable drum rim gripping jaw connected to an end of the boom.

The hook on the boom may be used in conjunction with a loading ramp adapter to maneuver portable loading ramps, also known as "dockboards" or "dock plates". These portable loading ramps typically weigh up to about 400 pounds. The adapter is a removable unit engageable with a slot formed in the loading ramp. It comprises a unitary body having upper and lower portions, the upper portion having a slot for receiving the hook of the boom, and the lower portion being extendible through a slot formed in a loading ramp. The lower portion has a first pair of arms engageable with the underside of the loading ramp and a second pair of arms engageable with the top side of the loading ramp.

The length of the slot in the loading ramp should be sufficient to permit passage of at least the first pair of arms when the adapter is in a first orientation, and the width of the slot should be such as to prevent passage of the first pair of arms and also to prevent passage of the second pair of arms when the adapter is in an orientation orthogonal to its first orientation.

The plate connected to the roller end of the rigid bar can be used not only as a drum support, but also as a pry plate. In a preferred embodiment, the plate is provided with a through hole for receiving a pin extending downwardly from a projection on the underside of the platform of a skid truck. The lifting and moving apparatus can be conveniently engaged with the pin on the skid truck, and used to raise the skids and maneuver the skid truck.

The rigid bar may comprise first and second tubular sections, the first tubular section extending from the roller end of the bar to an intermediate location along the length of the bar, and the second tubular section extending from the handle toward said intermediate location. One of the first and second tubular sections has a rigid element affixed to it and extending into the other of the tubular sections. Fastening means are provided for selectably connecting the other of the tubular sections to said rigid element at a first position in which the tubular sections substantially meet at the intermediate location, and a second position in which the tubular sections are spaced from each but connected to each other by the rigid element. This construction allows the rigid bar to be lengthened for increased leverage in handling especially heavy loads.

The second section of the rigid bar may be provided with a bend. The second section is reversible. That is, it is connectible to the first section in a first relationship in which the handle is located above the axis of the first section and in a second relationship in which the handle is located below the axis of the first section. This feature, which can be implemented either with or without the rigid element permitting lengthening of the bar, allows the height of the handle to be changed so that the handle is in an ergonomically efficient position for the various selectable boom positions.

With its boom in the collapsed position, in which it extends along the rigid bar, the lifting and moving apparatus can be used in conjunction with an article-handling attachment comprising a rigid article support pivotally, and removably, connected at a first location to a first end of the boom, and a link connected to the article-handling attachment at a second location spaced from said first location and removably connected to the rigid bar at one attachment point. In this way, the article-handling attachment is rigidly, but removably, connected to the rigid bar. The article-handling attachment can comprise a platform, allowing the lifting and moving apparatus be used as a hand truck. Alternatively, the article-handling attachment can comprise a pair of horizontally extending prongs spaced from each other and extending substantially in the same direction from the roller end of the bar, allowing the apparatus to be used as a hand-operated pallet truck.

DETAILED DESCRIPTION

Figure 1:
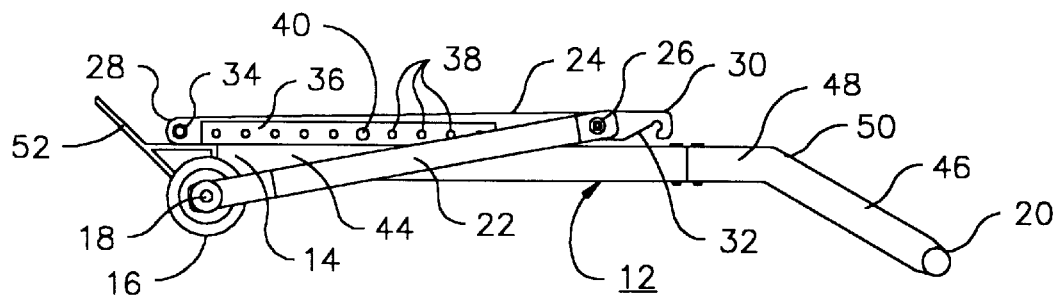
FIG. 1 is a side elevation of a lifting and moving apparatus in accordance with the invention, showing the boom in its collapsed condition.

The lifting and moving apparatus, shown collapsed in FIG. 1, comprises a rigid bar 12 having one end 14 adjacent to a roller 16, which is one of two rollers rotatable on a common axle 18, and a handle 20 at its opposite end. The handle is T-shaped, and its cross-bar is seen endwise in FIG. 1.

A strut 22, pivoted on axle 18, is pivotally connected to a boom 24 by a pivot pin 26, which is at an intermediate location along the length of the boom, between a first end 28 and a second end 30 of the boom, the pivot being closer to the second end than to the first end, and preferably as close as practicable to the second end. A similar strut, not shown in FIG. 1, is pivoted at the other end of the axle 18 and connected to the boom by pivot pin 26. A hook 32 is formed at the second end 30 of the boom, and a hole 34 extends transversely through the boom adjacent to its first end 28. In the configuration shown in FIG. 1, the boom 24 lies along the length of the rigid bar 12 in a channel 36, which is fixed to the upper side of the bar. The channel comprises two parallel sidewalls, only one of which is seen in FIG. 1. Each sidewall has a series of holes, holes 38 being spaced from one another along the length of the channel sidewall seen in FIG. 1, and each hole 38 being aligned with a corresponding hole in the opposite channel sidewall. A removable pin 40 extends through two of the aligned holes in the channel sidewalls and through a hole 42 (FIG. 2) of the boom, to lock the boom in its collapsed position.

As shown in FIG. 1, the bar 12 comprises two parts, 44 and 46, part 44 being preferably straight and extending from a location adjacent to the rollers to an intermediate location 48, and part 46 being bent at 50 and extending from intermediate location 48 to the handle 20. A plate 52, at the roller end of the bar extends from the axle 18 in a direction oblique to the direction extending from end 14 of bar 12 to the handle end. The plate enables the lifting and moving apparatus to be used as a pry lever when the boom is in its collapsed condition.

Figure 2:
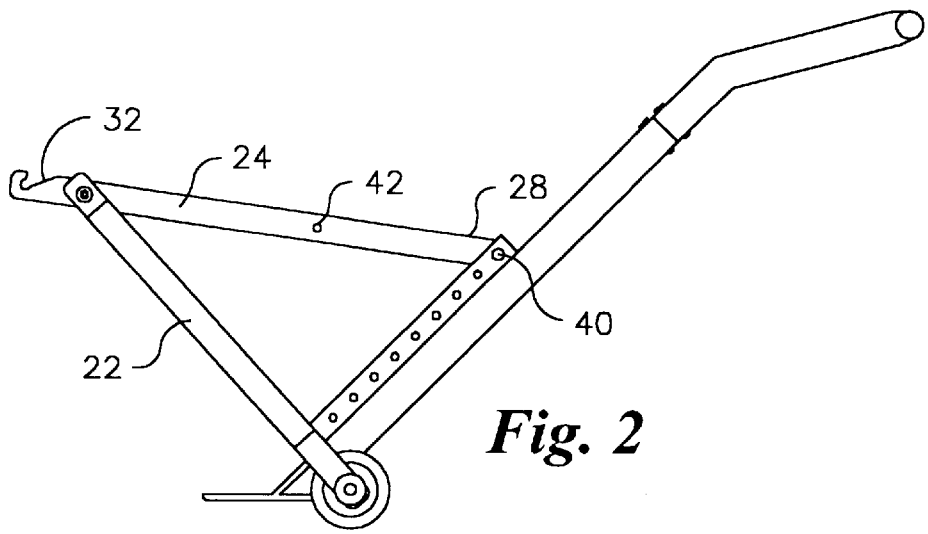
FIG. 2 is a side elevation of the same lifting and moving apparatus, showing the boom in a first of a plurality of selectable positions.

FIG. 2 shows the boom 24 in an extended condition, in which its end 28 is connected by pin 40 to the channel at an attachment point near the upper end of the channel. The boom is supported by the two struts including strut 22, so that its hook 32 is at a level suitable for lifting a five gallon bucket, for example, or for attachment by a chain or cable to an article to be moved.

Figure 3:
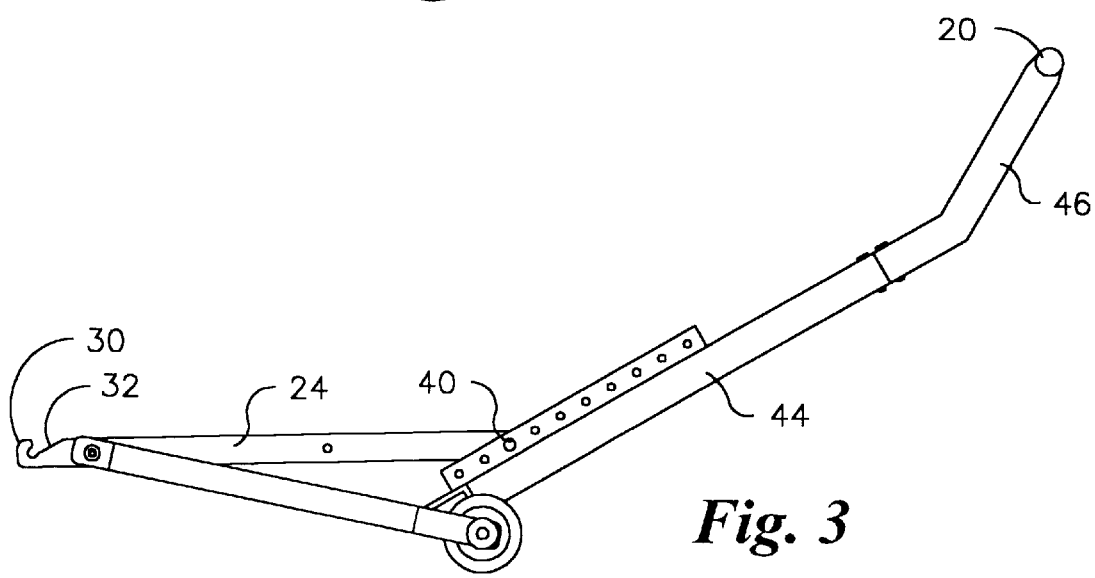
FIG. 3 is a side elevation of the same lifting and moving apparatus, showing the boom in another of its selectable positions.

FIG. 3 shows the boom 24 with its end 28 connected by pin 40 to the channel at an attachment point near the lower end of the channel. In this position, the hook 32 at the end 30 of the boom is suitable for attachment to a loading ramp. A way in which this can be accomplished will be described below with reference to FIGS. 6 and 7. With the boom connected to an attachment point near the lower end of the channel, part 46 of the bar can be reversed so that the handle 20 is located above the axis of section 44 rather than below it as in FIGS. 1 and 2. In this way, the handle is high enough so that the operator need not bend over to an uncomfortable position in order to move the article attached to hook 32.

Figure 4:
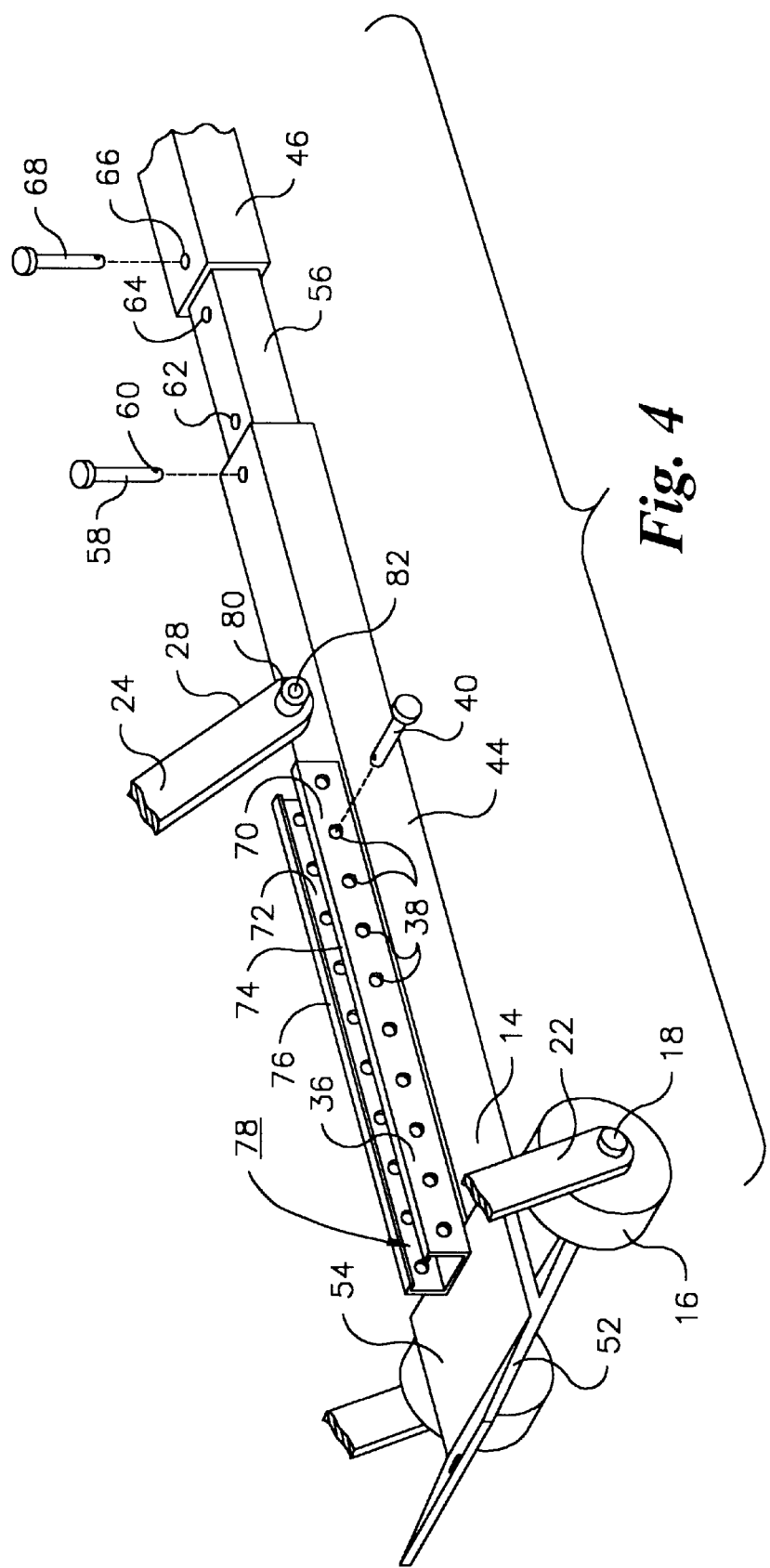
FIG. 4 is a fragmentary, exploded perspective view of the lifting and moving apparatus, showing details of the boom-capturing channel with plural attachment points, and the extensible bar feature.

In FIG. 4, which shows some of the details of the lifting and moving apparatus, it is seen that the plate 52 extends upward from axle 18 in oblique relation to the axis of section 44 of the bar, and is reinforced by another plate section 54, which is connected, e.g. by welding, directly to the end 14 of the bar. The sections 44 and 46 of the bar are both preferably tubular steel of rectangular cross-section. A smaller tubular steel section 56 extends into bar section 44 and is secured in place by a pin 58, which has a spring-loaded detent ball 60, which holds it firmly in place, but allows it to be inserted and removed manually. When section 56 is connected to section 44, two pin-receiving holes, 62 and 64, are exposed beyond the end of section 44. Section 46 of the bar may be secured to section 56 by aligning its hole 66 with one of holes 62 and 64, and inserting pin 68 through the aligned holes. Holes (not shown) are provided in the underside of section 56 opposite to holes 62 and 64, and likewise a hole (not shown) is provided in the underside of section 46 opposite to hole 66 so that pin 68, when inserted extends all the way through section 46, and so that section 46 can be reversed as illustrated in FIGS. 2 and 3. Section 46 can be connected to hole 64 to extend the handle for added leverage when handling very heavy loads. Moreover, sections 46 and 56 can be removed to permit the apparatus to be stored or packaged for shipment.

FIG. 4 also shows that channel 36 extends lengthwise along the top of section 44. The channel is preferably welded to section 44. It comprises two spaced side walls 70 and 72, having inturned flanges 74 and 76 respectively. The channel is open at both ends, and the edges of the flanges 74 and 76, which are opposite to each other in spaced relationship, define a slot 78 which is just wide enough to receive the end 28 of boom 24. The end 28 of the boom has pair of bosses, one of which is seen at 80, and the other of which (not shown) is similar but on the opposite side of the boom. A hole 82 extends through the bosses and through the end of the boom. The bosses enter the channel through one of the ends of the channel. Engagement of the bosses with the flanges 74 and 76 prevents the boom from becoming disengaged from the channel except at the channel ends, while allowing the end 28 of the boom to slide freely within the channel for adjustment. When the hole 82 in the end of the boom is aligned with a selected hole 38 in sidewall 70, and the opposite hole in sidewall 72, pin 40 can be inserted to secure the boom in place. This pin has a spring-loaded ball detent similar to that of pins 58 and 60, allowing it to be inserted and removed manually.

From the description thus far, it will be appreciated that the boom of the lifting and moving apparatus can be readily moved from its collapsed positions, as illustrated in FIG. 1, to any of several possible extended positions two of which are illustrated in FIGS. 2 and 3. The number of possible extended positions depends on the number of selectable attachment points at which the end 28 of the boom can be secured to the channel 36.

Figure 5:
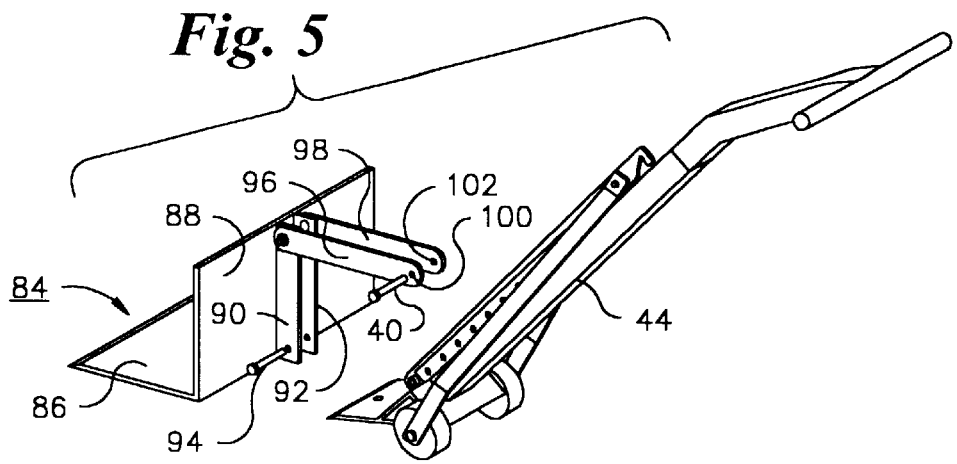
FIG. 5 is a perspective view showing the lifting and moving apparatus with a hand truck attachment.

With the boom in its collapsed condition, any of various attachments can be connected to the assembly as illustrated in FIG. 1 to produce a special purpose lifting and moving apparatus. As shown in FIG. 5, for example, an article-handling attachment 84 can be connected to the assembly to produce a hand truck. Attachment 84 comprises a horizontal plate 86 extending forward from the lower edge of a vertical plate 88. Two spaced, vertically extending ribs 90 and 92 are secured to the back of the vertical plate. The spacing between these ribs is similar to the spacing between the sidewalls of the channel 36, and such that the end 28 of the boom, including the bosses, can fit between them. With the boom in its collapsed condition, its end 28 extends downward beyond the end of the channel 36, and can therefore fit between the ribs 90 and 92. A pin 94, similar to pin 40, is inserted through holes adjacent to the lower ends of the ribs 90 and 92 to connect the ribs to the boom. Two links 96 and 98 are pivotally connected to the ribs near the upper ends of the ribs. These ribs have holes 100 and 102 near their free ends, which can be aligned with hole 42 (see FIG. 2) in the boom and with the holes in the channel that are aligned with hole 42 when the boom is in its collapsed position. Pin 40 is inserted through all five of these holes to secure the links 96 and 98 to the channel, thereby producing a three-point linkage rigidly connecting the attachment 84 to the assembly of FIG. 1 to produce a hand truck. The angular relationship between the plate 86 of the attachment and the axis of section 44 of the bar 12 depends on the lengths of links 96 and 98 and the location at which they are connected to ribs 90 and 92 relative to the holes at the lower ends of the ribs. These dimensions can be selected to achieve a desired relationship between the plate 86 and the axis of the bar section 44.

Figure 7:
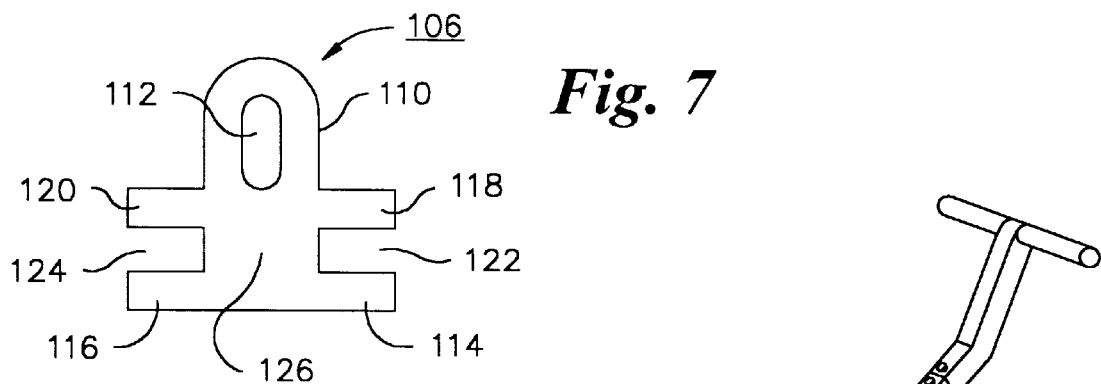
FIG. 7 is an elevational view showing details of the adapter of FIG. 6.
Figure 6:
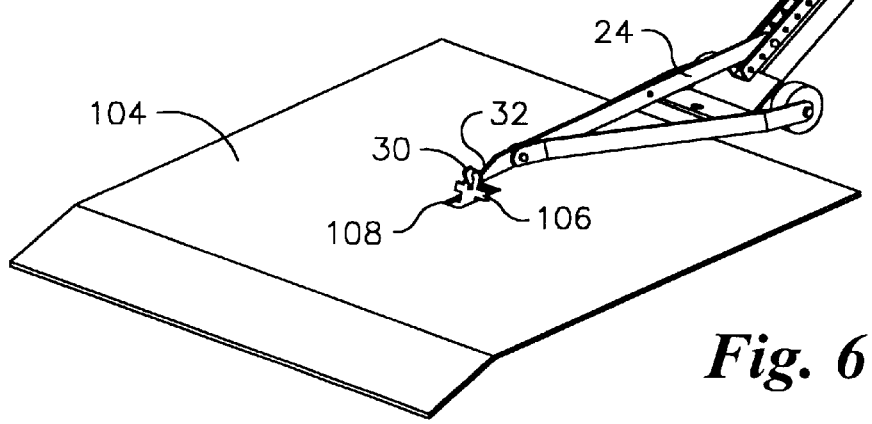
FIG. 6 is a perspective view showing the lifting and moving apparatus with a loading ramp and adapter.

In FIG. 6, the lifting and moving apparatus is configured as in FIG. 3 for use in maneuvering a loading ramp 104. The hook 32 at end 30 of the boom is engaged with an adapter 106, which is engaged in a slot 108 formed in the loading ramp. The slot is preferably located approximately at or above the center of gravity of the ramp. As shown in FIG. 7, the adapter 106 is in the form of a unitary steel body having an upper portion 110 with a slot 112 adapted to receive hook 32 on the boom. The steel body has a lower portion with a first pair of arms 114 and 116 extending laterally in opposite directions, and a second pair of arms 118 and 120, also extending laterally in opposite directions. Arms 118 and 120 are located above arms 114 and 116, and are spaced from arms 114 and 116 by a distance at least equal to the thickness of the loading ramp 104, forming slots 122 and 124 on opposite sides of a connecting portion 126.

The lengths of arms 114 and 116 are such that the distance between their outer ends is less than the length of slot 108 in the ramp. The width of the connecting portion 126 is less than the width of the slot 108, and the distance between the ends of arms 118 and 120 is greater than the width of the slot 108.

The adapter is inserted in the slot 108 of the ramp by aligning arms 114 and 116 with the length of the slot, inserting the adapter into the slot until arms 114 and 116 are below the underside of the ramp and arms 118 and 120 are above the top side of the ramp. Then the adapter is twisted 90 degrees to the position shown in FIG. 6 so that the upper arms 120 and 118 engage the top side of the ramp. The hook 32 of the boom can then be engaged with slot 112 of the adapter, and the lifting and moving apparatus can be used to maneuver the ramp into a desired position, for example to span the gap between the back of a truck and a loading dock.

The adapter is easily installed on a loading ramp, and can be quickly removed when the loading ramp is in position, so that it does not interfere with loading and unloading operations.

Figure 8:
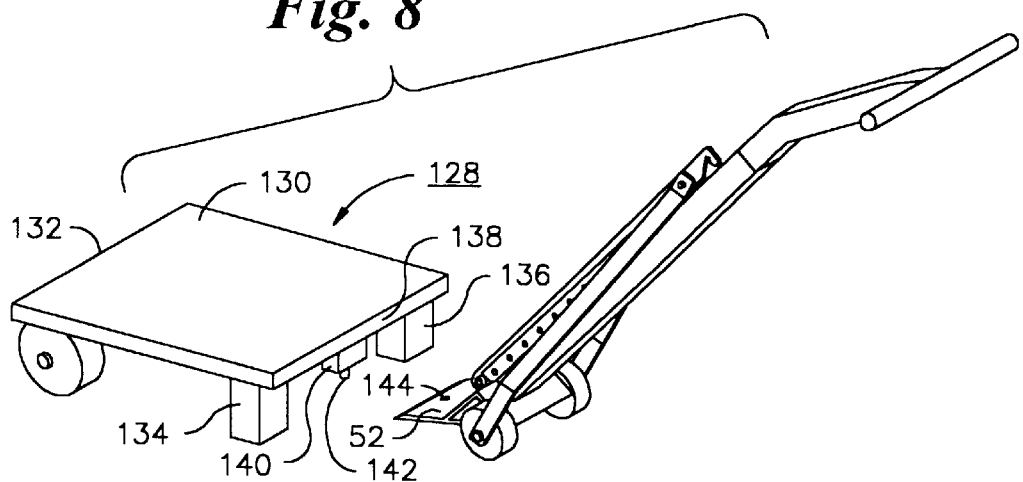
FIG. 8 is a perspective view showing the lifting and moving apparatus being used with a skid truck.

FIG. 8 shows a skid truck 128 comprising a platform 130 having a pair of wheels at one end 132, and pair of skids 134 and 136 at the opposite end 138. A projection 140 is located between the skids, and a pin 142 extends downwardly from the projection. The vertical dimension of the projection 140 and the length of the pin 142 are such that the end of the pin is above the level of the bottoms of skids 134 and 136 and therefore spaced from the surface on which the skids rest. The plate 52 of the lifting and moving apparatus is provided with a hole 144 which is able to receive pin 142.

To maneuver the skid truck, the handle of the lifting and moving apparatus is raised so that the plate 52 can be moved underneath pin 142. When the hole 144 is aligned with pin 142, the handle of the lifting and moving apparatus is lowered, thereby engaging the pin in the hole, engaging the top of the plate 52 with projection 140, and lifting the end 138 of the skid truck so that the skids are raised away from the floor. The skid truck is then supported by its own wheels and the wheels of the lifting and moving apparatus, which are steerable. Thus, the skid truck can be easily engaged and disengaged by the lifting and moving apparatus and readily maneuvered.

Figure 9:
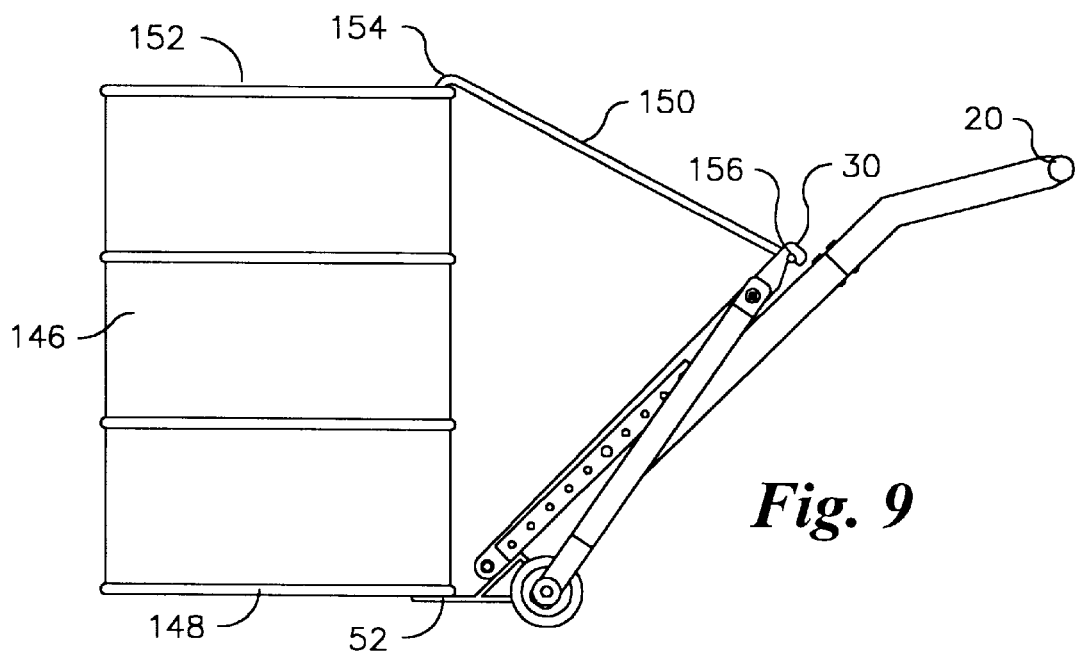
FIG. 9 is a perspective view showing the lifting and moving apparatus with a drum lifting attachment.

FIG. 9 shows how the lifting and moving apparatus can be used in handling containers such as 55 gallon drums. The boom 24 is locked in its collapsed condition, and a drum 146 is positioned on plate 52, with its lower rim 148 resting on the plate. An auxiliary rod 150 is connected between hook 30 and the upper rim 152 of the drum, the auxiliary rod having a hook 154 at one end for engagement with the upper rim of the drum and another hook 156 at its opposite end for engagement with the hook 30 on the boom. By providing several auxiliary rods of different lengths, a range of drum sizes can be accommodated.

Figure 10:
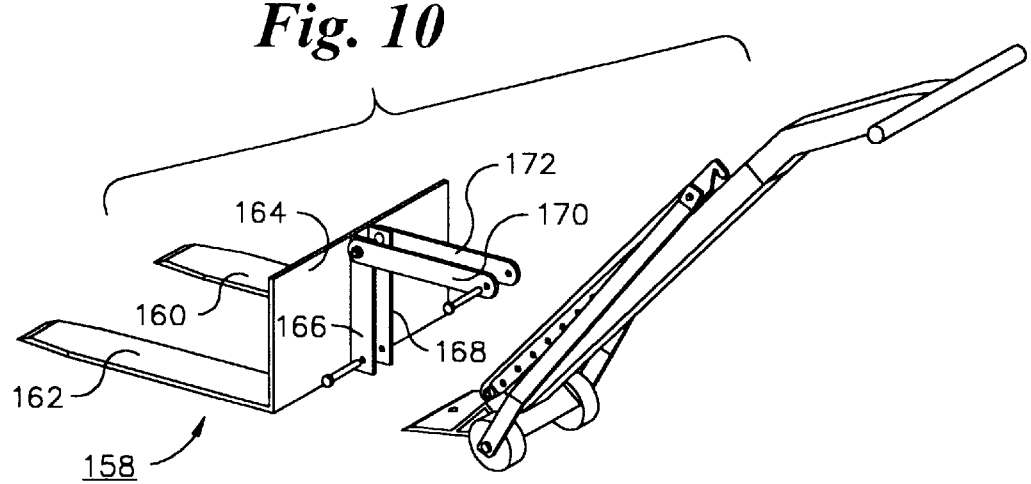
FIG. 10 is a perspective view showing the lifting and moving apparatus with a pallet truck attachment.

The lifting and moving apparatus can be converted to a manual pallet truck by attachment of an adapter 158 as shown in FIG. 10. The adapter comprises a pair of horizontal prongs 160 and 162 extending forward from a vertical plate 164. The adapter has ribs 166 and 168 and links 170 and 172 similar to the ribs and links of the hand truck adapter of FIG. 5, and is attached in the same way to the channel and boom. The pallet truck can be used to maneuver moderate loads on pallets.

Various other attachments can be used with the apparatus described. For example, in order to maneuver skid trucks lacking the projection and pin of FIG. 8, an adapter having a swivel similar to that of a conventional automobile jack, can be fastened to plate 52 for engagement with the underside of the skid truck. Other attachments can be provided for general or specific lifting applications. Moreover, various modifications can be made to the apparatus described. For example, instead of using a channel along the upper side of the rigid bar, the boom can be provided with a forked end which can be secured directly to the bar section 44 at one or more attachment points. The apparatus can be made from various materials other than steel, for example aluminum, alloys and fiber-reinforced polymers.

Still other modifications can be made without departing from the scope of the invention as defined in the following claims.

I claim:

1. A lifting and moving apparatus comprising:

a rigid bar having two ends;

at least one roller adjacent to one end of the rigid bar and a handle at the other end of the rigid bar;

at least one strut extending from a location adjacent to said one end of the rigid bar and in pivoting relationship with the rigid bar;

at least one attachment point on the rigid bar at a location spaced from said one end thereof in a direction toward the other end thereof; and a load supporting boom having first and second ends, the load supporting boom being pivoted to the at least one strut at a location between the first and second ends of the boom, the first end of the boom being selectively connectible to each said at least one attachment point, and the boom extending past said at least one strut whereby an article to be lifted and moved can be attached to the second end of the boom;

the apparatus including an elongated channel attached to the rigid bar, the channel having a pair of opposed, spaced sidewalls extending lengthwise along the rigid bar, and flange means on at least one of the sidewalls, defining a slot through which the boom can extend so that the first end of the boom is located between the sidewalls of the channel, in which the first end of the boom has means engageable with said flange means for preventing the first end of the boom from being removed from the channel except at the ends of the channel so that said first end of the boom is guided for lengthwise movement within the channel, in which said at least one attachment point comprises a plurality of attachment points spaced along the length of the channel, and including means for connecting said first end of the boom to the channel at any selected one of said plurality of attachment points.

2. A lifting and moving apparatus comprising:

a rigid bar having two ends;

at least one roller adjacent to one end of the rigid bar and a handle at the other end of the rigid bar;

at least one strut extending from a location adjacent to said one end of the rigid bar and in pivoting relationship with the rigid bar;

at least one attachment point on the rigid bar at a location spaced from said one end thereof in a direction toward the other end thereof; and a load supporting boom having first and second ends, the load supporting boom being pivoted to the at least one strut at a location between the first and second ends of the boom, the first end of the boom being selectively connectible to each said at least one attachment point, and the boom extending past said at least one strut whereby an article to be lifted and moved can be attached to the second end of the boom;

the apparatus including an elongated channel attached to the rigid bar, the channel having a pair of opposed, spaced sidewalls extending lengthwise along the rigid bar, and a pair of opposed flanges extending toward each other from the sidewalls, the opposed flanges defining a slot through which the boom can extend so that the first end of the boom is located between the sidewalls of the channel, in which the first end of the boom has a pair of transversely extending bosses, the bosses being on opposite sides of the boom and respectively engageable with said opposed flanges so that said first end of the boom is guided for lengthwise movement within the channel and prevented from removal from the channel except at the ends of the channel, in which the sidewalls of the channel have a pair of aligned holes at each said at least one attachment point, and in which the boom has a through hole extending through said bosses, the through hole being selectively alignable with the pair of aligned holes at each said at least one attachment point.

3. A lifting and moving apparatus comprising:

a rigid bar having two ends;

at least one roller adjacent to one end of the rigid bar and a handle at the other end of the rigid bar;

at least one strut extending from a location adjacent to said one end of the rigid bar and in pivoting relationship with the rigid bar;

at least one attachment point on the rigid bar at a location spaced from said one end thereof in a direction toward the other end thereof; and a load supporting boom having first and second ends, the load supporting boom being pivoted to the at least one strut at a location between the first and second ends of the boom, the first end of the boom being selectively connectible to each said at least one attachment point, and the boom extending past said at least one strut whereby an article to be lifted and moved can be attached to the second end of the boom;

in which the length of the load supporting boom is such that, when its first end is disconnected from said at least one attachment point on the rigid bar, the boom can be brought into a position in which it extends along the rigid bar with its first end located adjacent to said one end of the rigid bar and its second end located adjacent to a location on the rigid bar between the ends of the rigid bar, and including at least one plate fixed to the rigid bar, the plate having at least one hole, each said hole being located at one said at least one attachment point, the boom having a first hole at its first end alignable with the hole at each said at least one attachment point, and a second hole at an intermediate location between its first and second ends, the second hole being alignable with the hole at one said at least one attachment point when the boom is in said position in which it extends along the rigid bar, whereby the first end of the boom can be secured at each said at least one attachment point and the boom can also be secured in the position in which it extends along the rigid bar.

4. A lifting and moving apparatus comprising:

a rigid bar having two ends;

at least one roller adjacent to one end of the rigid bar and a handle at the other end of the rigid bar;

at least one strut extending from a location adjacent to said one end of the rigid bar and in pivoting relationship with the rigid bar;

at least one attachment point on the rigid bar at a location spaced from said one end thereof in a direction toward the other end thereof; and a load supporting boom having first and second ends, the load supporting boom being pivoted to the at least one strut at a location between the first and second ends of the boom, the first end of the boom being selectively connectible to each said at least one attachment point, and the boom extending past said at least one strut whereby an article to be lifted and moved can be attached to the second end of the boom;

in which the length of the load supporting boom is such that, when its first end is disconnected from said at least one attachment point on the rigid bar, the boom can be brought into a position in which it extends along the rigid bar with its first end located adjacent to said one end of the rigid bar and its second end located adjacent to a location on the rigid bar between the ends of the rigid bar, and including a channel fixed to the rigid bar, the channel having a pair of opposite, spaced side walls each having a plurality of holes, there being a hole in one side wall aligned with each hole of the plurality of holes in the other side wall, whereby said at least one attachment point comprises a plurality of attachment points provided on the rigid bar, each attachment point of said plurality of attachment points having a pair of aligned holes, the boom having a first hole at its first end alignable with the holes at each attachment point of said plurality of attachment points, and a second hole at an intermediate location between its first and second ends, the second hole being alignable with the holes at one attachment point of said plurality of attachment points when the boom is in said position in which it extends along the rigid bar, whereby the first end of the boom can be secured at each attachment point of said plurality of attachment points and the boom can also be secured in the position in which it extends along the rigid bar.

5. A lifting and moving apparatus comprising:

a rigid bar having two ends;

at least one roller adjacent to one end of the rigid bar and a handle at the other end of the rigid bar;

at least one strut extending from a location adjacent to said one end of the rigid bar and in pivoting relationship with the rigid bar;

at least one attachment point on the rigid bar at a location spaced from said one end thereof in a direction toward the other end thereof; and a load supporting boom having first and second ends, the load supporting boom being pivoted to the at least one strut at a location between the first and second ends of the boom, the first end of the boom being selectively connectible to each said at least one attachment point, and the boom extending past said at least one strut whereby an article to be lifted and moved can be attached to the second end of the boom;

in which the length of the load supporting boom is such that, when its first end is disconnected from one said at least one attachment point on the rigid bar, the boom can be brought into a position in which it extends along the rigid bar with its first end located adjacent to said one end of the rigid bar and its second end located adjacent to a location on the rigid bar between the ends of the rigid bar, and including an article-handling attachment comprising a rigid article support pivotally, and removably, connected at a first location to said first end of the boom, with the boom in said position in which it extends along the rigid bar, and a link connected to the article-handling attachment at a second location spaced from said first location and removably connected to the rigid bar at one said at least one attachment point, whereby the article-handling attachment is rigidly, but removably, connected to the rigid bar.

6. A lifting and moving apparatus according to claim 5, in which the article-handling attachment comprises a platform, whereby the apparatus can be used as a hand truck.

7. A lifting and moving apparatus according to claim 5, in which the article-handling attachment comprises a pair of horizontally extending prongs spaced from each other and extending substantially in the same direction from said one end of the bar, whereby the apparatus can be used as a hand-operated pallet truck.

* * * * *